(12) United States Patent
Xing et al.

(10) Patent No.: US 11,434,318 B2
(45) Date of Patent: Sep. 6, 2022

(54) SELF-HARDENING ORGANIC SYNTHETIC RESIN MIXTURE USED FOR ADDITIVE MANUFACTURING, AND APPLICATION THEREFOR

(71) Applicant: KOCEL CHEMICALS CO., LTD., Ningxia (CN)

(72) Inventors: Jinlong Xing, Ningxia (CN); Fan Peng, Ningxia (CN); Hongkai Zhang, Ningxia (CN); Wen Ma, Ningxia (CN); Wen Han, Ningxia (CN)

(73) Assignee: KOCEL INTELLIGENT MACHINERY LIMITED, Ningxia (CN)

( * ) Notice: Subject to any disclaimer, the term of this patent is extended or adjusted under 35 U.S.C. 154(b) by 0 days.

(21) Appl. No.: 16/742,648

(22) Filed: Jan. 14, 2020

(65) Prior Publication Data
US 2020/0231732 A1    Jul. 23, 2020

Related U.S. Application Data

(63) Continuation of application No. PCT/CN2018/099710, filed on Aug. 9, 2018.

(30) Foreign Application Priority Data

Aug. 11, 2017   (CN) .......................... 201710685162.7

(51) Int. Cl.
| | | |
|---|---|---|
| C08G 8/10 | (2006.01) |
| B33Y 10/00 | (2015.01) |
| B33Y 50/02 | (2015.01) |
| B33Y 70/00 | (2020.01) |
| B33Y 80/00 | (2015.01) |
| C08K 5/098 | (2006.01) |
| C08K 5/42 | (2006.01) |

(52) U.S. Cl.
CPC ................ C08G 8/10 (2013.01); *B33Y 10/00* (2014.12); *B33Y 50/02* (2014.12); *B33Y 70/00* (2014.12); *B33Y 80/00* (2014.12); *C08K 5/098* (2013.01); *C08K 5/42* (2013.01)

(58) Field of Classification Search
CPC . C08G 8/10; C08K 5/098; C08K 5/42; B33Y 10/00; B33Y 50/02; B33Y 70/00; B33Y 80/00
See application file for complete search history.

(56) References Cited

U.S. PATENT DOCUMENTS

| | | | | | |
|---|---|---|---|---|---|
| 4,197,385 A | * | 4/1980 | Laitar | ..................... | B22C 1/224 |
| | | | | | 525/480 |
| 4,476,191 A | * | 10/1984 | Girgis | ..................... | C08G 8/08 |
| | | | | | 428/378 |
| 5,591,810 A | * | 1/1997 | Hesse | ..................... | C08G 8/36 |
| | | | | | 525/480 |

FOREIGN PATENT DOCUMENTS

| | | |
|---|---|---|
| CN | 104086734 A | 10/2014 |
| CN | 104817665 A | 8/2015 |
| CN | 105131516 A | 12/2015 |
| CN | 105949418 A | 9/2016 |
| CN | 106543687 A | 3/2017 |
| JP | S6259664 A | 3/1987 |

* cited by examiner

*Primary Examiner* — Shane Fang
(74) *Attorney, Agent, or Firm* — Wayne IP LLC

(57) ABSTRACT

The present invention relates to organic polymer synthetic materials, and discloses a self-curing organic synthetic resin composition for additive manufacturing. The self-curing organic synthetic resin composition includes 30-75% by weight of a linear thermoplastic phenolic resin and 25-70% by weight of a phenol modified furan resin. The self-curing organic synthetic resin composition is prepared through three stages. The linear thermoplastic phenolic resin prepared in stage (1) and the phenol modified furan resin prepared in stage (2) are mixed in a certain weight ratio in stage (3) to obtain the self-curing organic synthetic resin composition for additive manufacturing, which has the advantages of high strength at normal temperature, excellent resistance to high temperature, high activity and excellent collapsibility. Thus, the self-curing organic synthetic resin composition provided in the invention is suitable for additive manufacturing, and particularly for 3D printing in mold casting.

4 Claims, No Drawings

SELF-HARDENING ORGANIC SYNTHETIC RESIN MIXTURE USED FOR ADDITIVE MANUFACTURING, AND APPLICATION THEREFOR

CROSS-REFERENCE TO RELATED APPLICATIONS

This application is a continuation of International Patent Application No. PCT/CN2018/099710, filed on Aug. 9, 2018, which claims the benefit of priority from Chinese Application No. 201710685162.7, filed on Aug. 11, 2017. The content of the aforementioned applications, including any intervening amendments thereto, are incorporated herein by reference.

TECHNICAL FIELD

The present application relates to organic polymer synthetic materials, and more particularly to a self-curing organic synthetic resin composition for additive manufacturing and uses thereof.

BACKGROUND OF THE INVENTION

Three-dimensional printing (3DP), also known as additive manufacturing was put forward by E. Sachs et al. in 1992. In a 3D Printing process, materials are ejected in droplets through a nozzle, similar to the way that the inkjet printer works, and the materials are cured layer-by-layer according to a certain path as designed to form the final product.

Currently, the organic synthetic resin for additive manufacturing includes a self-curing furan resin and a self-curing basic phenolic resin. The inorganic resin for additive manufacturing is usually a self-curing sodium silicate binder.

Chinese Patent Publication No. 105949418 A discloses a self-curing furan resin for 3D Printing in aluminum casting. Chinese Patent Publication No. 106543687 A discloses a graphene oxide-modified self-curing furan resin for 3D Printing. Chinese Patent Publication No. 104086734 A discloses a furan resin for sand 3D Printing. These self-curing furan resins facilitate rapid curing at normal temperature and fulfill basic industrial requirements of additive manufacturing. However, these self-curing furan resins have poor resistance to high temperature, displaying a tensile strength of only 0.15 MPa at 1000° C., which leads to the defects such as sand burning and veining during casting. These defects occur more frequently on large-scale cast-iron and steel castings that require high casting temperature, thus limiting the further use of self-curing furan resin binders in large-scale cast-iron and steel castings.

The self-curing sodium silicate binder is eco-friendly and low-cost compared to the organic resin. However, the self-curing sodium silicate binder has the disadvantages of low tensile strength at normal temperature (about 1.2 MPa), poor collapsibility and difficult sand cleaning process. Chinese Patent Publication No. 104923717 A discloses an inorganic binder for sand 3D Printing in non-ferrous metal casting. The inorganic binder disclosed herein has a compressive strength of about 4.5 MPa, and a low tensile strength at normal temperature (about 1.2 MPa) due to small-molecule structure and low toughness of the inorganic binder. The inorganic binder disclosed herein has a high residual strength at 800° C. (about 0.5 MPa) and poor collapsibility, resulting in a difficult sand cleaning process. The sodium silicate binder disclosed herein has a usable life in the range of 5-15 min and weak adhesion activity, resulting in low efficiency in producing castings.

Phenolic resins have different molecular structure compared to furan resins, so that the self-curing basic phenolic resin shows different performances, such as good resistance to high temperature and low strength at normal temperature (only about 1.2 MPa). Chinese Patent Publication No. 104817665 A discloses a basic phenolic resin for 3D Printing, which has a low tensile strength at normal temperature (about 1.2 MPa).

The prior art fails to solve the problem that a 3D printed object produced by additive manufacturing has poor resistance to high temperature, low tensile strength at normal temperature and poor collapsibility.

SUMMARY OF THE INVENTION

This invention provides a self-curing organic synthetic resin composition for additive manufacturing and uses thereof to address the problem in the prior art that a 3D printed object produced by additive manufacturing has poor resistance to high temperature, low tensile strength at normal temperature and poor collapsibility.

The technical solutions of the invention are described as follows.

A self-curing organic synthetic resin composition for additive manufacturing, comprising 30-75% by weight of a linear thermoplastic phenolic resin and 25-70% by weight of a phenol modified furan resin.

The linear thermoplastic phenolic resin is prepared from materials comprising 15-45% by weight of a phenolic compound, 30-60% by weight of an aldehyde compound, 0.2-0.8% by weight of an organic acid or an organic acid salt as a catalyst, and an auxiliary comprising 1-4% by weight of a polymerization inhibitor, 8-28% by weight of an organic solvent, 0.3-0.9% by weight of a coupling agent, 0.1-0.7% by weight of a toughening agent and 1-5% by weight of a modifier, through addition polymerization reaction, wherein all of the percents by weight are based on the total weight of the materials.

The phenolic compound in the linear thermoplastic phenolic resin is selected from the group consisting of phenol, p-aminophenol, p-cresol, m-cresol, m-aminophenol, p-nitrophenol, p-chloro-m-xylenol, p-tert-octyl phenol and a combination thereof.

The aldehyde compound in the linear thermoplastic phenolic resin is selected from the group consisting of formaldehyde and a liquid aldehyde containing two or more carbon atoms; and the liquid aldehyde is selected from the group consisting of acetaldehyde, butyraldehyde, valeraldehyde, terephthalaldehyde, trioxane, metaldehyde, dimethoxymethane, o-chlorobenzaldehyde and a combination thereof.

The organic acid in the linear thermoplastic phenolic resin is selected from the group consisting of formic acid, acetic acid, p-toluene sulfonic acid, acrylic acid, benzoic acid, propionic acid and a combination thereof.

The organic acid salt in the linear thermoplastic phenolic resin is selected from the group consisting of zinc acetate, magnesium acetate, sodium benzoate, calcium propionate, aluminum acrylate and a combination thereof.

The polymerization inhibitor in the linear thermoplastic phenolic resin is molecular, and is selected from the group consisting of hydroquinone, p-benzoquinone, 4-tert-butylcatechol, phenothiazine and a combination thereof.

The organic solvent in the linear thermoplastic phenolic resin is a polar organic solvent with low molecular weight, and is selected from the group consisting of methanol, ethylene glycol, ethanol, acetone, isopropanol, methyl butanone and a combination thereof.

The coupling agent in the linear thermoplastic phenolic resin is silane which is selected from the group consisting of silane KH-560, silane KH-550, silane KH-602 and a combination thereof.

The toughening agent in the linear thermoplastic phenolic resin is selected from the group consisting of polyvinyl butyral, polyether sulfone, polyphenylene ether ketone, polyvinyl alcohol and a combination thereof.

The modifier in the linear thermoplastic phenolic resin is an aromatic solvent oil which is selected from the group consisting of an aromatic solvent oil S-100, an aromatic solvent oil S-150, an aromatic solvent oil S-200 and a combination thereof, thereby allowing the linear thermoplastic phenolic resin for higher resistance to high temperature.

The phenol modified furan resin is prepared from materials comprising 12-28% by weight of a phenolic compound, 20-70% by weight of furfuryl alcohol, 5-15% by weight of an aldehyde compound, 0.4-1.2% by weight of an organic acid as a catalyst, and an auxiliary comprising 4-16% by weight of a diluent, 0.3-0.7% by weight of a pH regulator, 0.3-0.7% by weight of an aldehyde trapping agent, 0.3-1.3% by weight of a coupling agent, 0-10% by weight of an organic waste liquid, 0.2-0.6% by weight of a heat stabilizer and 3-9% by weight of an additive, through addition polymerization reaction, wherein all of the percents by weight are based on the total weight of the materials.

The phenolic compound in the phenol modified furan resin is phenol, bisphenol A, a monoalkyl- or dialkyl-substituted phenol.

The monoalkyl- or dialkyl-substituted phenol is selected from the group consisting of p-cresol, m-cresol, o-cresol, 3-methyl-4-isopropylphenol, 3-methyl-5-ethylphenol, 2,6-di-tert-butyl-4-ethylphenol and a combination thereof.

The furfuryl alcohol in the phenol modified furan resin comprises 0.7% or less by weight of residual aldehyde, 0.3% or less by weight of water and 98% or more by weight of furfuryl alcohol; and the furfuryl alcohol in the phenol modified furan resin has a cloud point of 10° C. or less and an acidity of 0.01 mol/L or less.

The aldehyde compound in the phenol modified furan resin is selected from the group consisting of an aqueous formaldehyde solution having 36.5 wt. % formaldehyde, furfural, acetaldehyde, paraformaldehyde powders, benzaldehyde, phenylacetaldehyde, citral and a combination thereof.

The organic acid in the phenol modified furan resin is selected from the group consisting of formic acid, acetic acid, citric acid, benzoic acid, phthalic acid, oxalic acid, malonic acid, phenylacetic acid, succinic acid and a combination thereof.

The diluent in the phenol modified furan resin is selected from the group consisting of methanol, ethanol, isopropanol, furfuryl alcohol, ethylene glycol, toluene, petroleum ether and a combination thereof.

The pH regulator in the phenol modified furan resin is an aqueous alkali metal hydroxide solution having 48 wt. % alkali metal hydroxide, and the alkali metal hydroxide is one or two of sodium hydroxide and potassium hydroxide.

The aldehyde trapping agent in the phenol modified furan resin is an ammonia solution having 25-28 wt. % ammonia.

The coupling agent in the phenol modified furan resin is an aqueous silane which is selected from the group consisting of silane KH-560, silane KH-550, silane KH-602 and a combination thereof.

The organic waste liquid in the phenol modified furan resin is produced by cleaning a printhead of a 3D inkjet printer during 3D inkjet printing in casting, and the organic waste liquid comprises 54% by weight of ethylene glycol, 36% by weight of ethanol, 2% by weight of furan resin and 8% by weight of furfuryl alcohol.

The heat stabilizer in the phenol modified furan resin is selected from the group consisting of phosphite, epoxy soybean oil, epoxy ester, pentaerythritol, xylitol, mannitol and a combination thereof.

The additive in the phenol modified furan resin is introduced to improve environmental performance of the phenol modified furan resin and reduce cost in resin production and use, and the additive is one or two of syrup and fructose.

The invention further provides use of the self-curing organic synthetic resin composition in additive manufacturing, wherein the self-curing organic synthetic resin composition is used for the additive manufacturing in the presence of a water-soluble or alcohol-soluble acidic solution.

The water-soluble or alcohol-soluble acidic solution is an aqueous or alcoholic sulfonic acid solution having a total acidity of 16-32% and a free acid of 5% or less during 3D additive manufacturing.

The water-soluble or alcohol-soluble acidic solution is 20-60% by weight of the self-curing organic synthetic resin composition for additive manufacturing.

In some embodiments, the water-soluble or alcohol-soluble acidic solution is uniformly mixed with raw sand materials to obtain a mixture; a layer of the mixture is laid onto a printing table; the self-curing organic synthetic resin composition is sprayed onto the layer by a piezoelectric printhead according to a 3D model designed by a computer program, wherein the layer is rapidly cured at normal temperature due to the reaction between the self-curing organic synthetic resin composition and water-soluble or alcohol-soluble acidic solution applied on surfaces of the raw sand materials; a next layer of the mixture is laid down over previous layers followed by spraying the self-curing organic synthetic resin composition and curing; the processes of laying, spraying and curing are repeated until a top layer is completed. Raw sand materials from unprinted areas are removed to obtain a 3D printed final product.

Compared to the prior art, this invention has the following beneficial effects.

(1) The self-curing organic synthetic resin composition has a viscosity of 10-14 mpa·s at 25° C., which meets the requirement of additive manufacturing.

(2) The self-curing organic synthetic resin composition has a high tensile strength at normal temperature (above 2.0 MPa), while under the same conditions, the self-curing furan resin has a tensile strength of only 1.4 MPa at normal temperature, and the self-curing sodium silicate binder and the self-curing basic phenolic resin share the tensile strength of only 1.2 MPa at normal temperature.

(3) The self-curing organic synthetic resin composition has excellent resistance to high temperature, since it has a tensile strength of over 1.2 MPa at 1000° C., while under the same conditions, the self-curing furan resin has a tensile strength of only 0.15 MPa at 1000° C.

(4) The self-curing organic synthetic resin composition has high activity, since it reacts quickly with an aqueous or alcoholic sulfonic acid solution having a total acidity of 16-32% and a free acid of 5% or less. During the reaction, it has a usable life in the range of 0.5-2 min at sand temperature of 25° C. While under the same conditions, the self-curing furan resin and the self-curing sodium silicate binder each react with the aqueous or alcoholic sulfonic acid solution having a total acidity of 16-32% and a free acid of 5% or less. During the reaction, the self-curing furan resin has a usable life in the range of 3-7 min, and the self-curing sodium silicate binder has a usable life in the range of 5-15 min.

(5) The self-curing organic synthetic resin composition has a residual tensile strength of 0.2 MPa or less at 1000° C. Under the same conditions, the self-curing sodium silicate binder has a residual tensile strength of about 0.5 MPa at 1000° C. The contrast proves that the self-curing organic synthetic resin composition has excellent collapsibility, resulting in an easy sand cleaning process in the late stage of casting production.

(6) An organic waste liquid which is generated during 3D inkjet printing in casting is reapplied to the resin system, reducing the cost of resin production and use, and reducing the environmental pollution.

(7) Syrup and fructose, as eco-friendly materials, are introduced into the self-curing organic synthetic resin composition to partially replace furfuryl alcohol in raw materials, facilitating the environmental protection.

(8) The self-curing organic synthetic resin composition is stable, and after a long-term storage, there is neither crystal formation nor changes in performance and indexes.

The self-curing organic synthetic resin composition provided in the invention has advantages of high strength at normal temperature, excellent resistance to high temperature, high activity and excellent collapsibility, so it is suitable for additive manufacturing, and particularly for 3D printing in mold casting.

DETAILED DESCRIPTION OF EMBODIMENTS

This invention will be described in detail below with reference to various embodiments, and these embodiments are only for illustration and are not intended to limit the present invention.

Example 1

Stage 1: Preparation of Linear Thermoplastic Phenolic Resin

The raw materials for the linear thermoplastic phenolic resin was shown in Table 1.

TABLE 1

Raw materials for linear thermoplastic phenolic resin

| Raw materials | Amount (wt. %) | Specific materials |
|---|---|---|
| Phenolic compound | 30 | Phenol |
| Aldehyde compound | 45 | Formaldehyde |
| Organic acid | 0.5 | Formic acid |
| Polymerization inhibitor | 2.5 | Hydroquinone |
| Organic solvent | 18 | Methanol |
| Coupling agent | 0.6 | Silane KH-560 |
| Toughening agent | 0.4 | Polyvinyl butyral |
| Modifier | 3 | Aromatic solvent oil S-100 |

Process of producing the linear thermoplastic phenolic resin was described as follows.

(1) 30% by weight of a phenolic compound, 0.5% by weight of an organic acid as a catalyst and 2.5% by weight of a polymerization inhibitor were added to an enamel reactor followed by stirring, and then 45% by weight of an aldehyde compound was added to the enamel reactor.

(2) A steam valve was opened to heat the mixture, and the temperature raised to 85-90° C. in 25-30 min and was maintained at 85-90° C. for 30-40 min.

(3) The temperature further raised to 100-105° C. in 10-20 min and was maintained at 100-105° C. for 120-150 min.

(4) The mixture was subjected to vacuum dehydration until a desired level of dehydration was reached.

(5) The temperature was dropped to 70-75° C., and 18% by weight of an organic solvent, 0.4% by weight of a toughening agent and 3% by weight of a modifier were added to the enamel reactor followed by stirring for 60-90 min.

(6) The temperature was further dropped to 30-35° C., and 0.6% by weight of silane as a coupling agent was added to the enamel reactor followed by stirring for 40-60 min. The mixture prepared herein was unloaded for use.

Stage 2: Preparation of Phenol Modified Furan Resin

The raw materials for the phenol modified furan resin was shown in Table 2.

TABLE 2

Raw materials for phenol modified furan resin

| Raw materials | Amount (wt. %) | Specific materials and requirements |
|---|---|---|
| Phenolic compound | 20 | Phenol |
| Furfuryl alcohol | 45 | Furfuryl alcohol that includes 0.7% or less by weight of residual aldehyde, 0.3% or less by weight of water and 98% or more by weight of furfuryl alcohol, and has a cloud point of 10° C. or less and an acidity of 0.01 mol/L or less |
| Aldehyde compound | 10 | Aqueous formaldehyde solution having 36.5 wt. % formaldehyde |
| Organic acid | 0.8 | Formic acid |
| Diluent | 10 | Methanol |
| PH regulator | 0.5 | Aqueous solution having 48 wt. % sodium hydroxide |
| Aldehyde trapping agent | 0.5 | Ammonia solution having 25-28 wt. % ammonia |

TABLE 2-continued

Raw materials for phenol modified furan resin

| Raw materials | Amount (wt. %) | Specific materials and requirements |
|---|---|---|
| Coupling agent | 0.8 | Silane KH-560 |
| Organic waste liquid | 6 | 54% by weight of ethylene glycol, 36% by weight of ethanol, 2% by weight of furan resin and 8% by weight of furfuryl alcohol |
| Heat stabilizer | 0.4 | Phosphite |
| Additive | 6 | Syrup |

Process of producing the phenol modified furan resin was described as follows.

(1) 20% by weight of a phenolic compound, 10% by weight of an aldehyde compound and 0.8% by weight of an organic acid as a catalyst were added to an enamel reactor followed by stirring.

(2) A steam valve was opened to heat the mixture, and after the temperature raised to 70-75° C., 25% by weight of furfuryl alcohol was added to the enamel reactor, and the temperature was maintained at 70-75° C. for 55-60 min.

(3) The temperature raised to 80-85° C. in 10-20 minutes, and then 10% by weight of furfuryl alcohol was added to the enamel reactor, and the temperature was maintained at 80-85° C. for 60-90 min.

(4) The temperature raised to 95-100° C. in 10-20 minutes, and then 0.5% by weight of a pH regulator was added to the enamel reactor to adjust pH of the mixture to about 5.7-6.0, and 10% by weight of furfuryl alcohol was added to the enamel reactor, and the temperature was maintained at 95-100° C. for 120-150 min.

(5) At 95-100° C., 6% by weight of an organic waste liquid, 0.4% by weight of a heat stabilizer and 6% by weight of additive were added to the enamel reactor followed by stirring for 50-60 min.

(6) The temperature was dropped to 60-65° C., and 10% by weight of a diluent was added to the enamel reactor followed by stirring for 30-60 min.

(7) The temperature was dropped to 40-45° C., and 0.5% by weight of an aldehyde trapping agent was added to the enamel reactor followed by stirring for 30-60 min.

(8) The temperature was dropped to 30-35° C., and 0.8% by weight of water-based silane as a coupling agent was added to the enamel reactor followed by stirring for 30-60 min. The mixture prepared herein was unloaded for use.

Stage 3: Preparation of Self-Curing Organic Synthetic Resin Composition for Additive Manufacturing 35% by weight of the linear thermoplastic phenolic resin prepared in stage (1) and 65% by weight of the phenol modified furan resin prepared in stage (2) were added to an enamel reactor followed by stirring. Then, the temperature raised to 35-40° C. and was maintained at 35-40° C. for 60-90 min. The mixture prepared herein was unloaded, tested and packaged to obtain the self-curing organic synthetic resin composition for additive manufacturing.

The self-curing organic synthetic resin composition prepared by this method has a viscosity of 11.5 mpa·s at 25° C., a surface tension of 34 mN/s at 20° C., an impurity content of 0.04%, a free formaldehyde content of 0.12% and a density of 1.086 g/ml at 20° C. It has a tensile strength of 2.16 MPa at normal temperature for 24 h, a tensile strength of 1.32 MPa at 1000° C. and a residual tensile strength of 0.12 MPa at 1000° C. It has a usable life of 1.2 min at 25° C.

Example 2

Stage 1: Preparation of Linear Thermoplastic Phenolic Resin

The raw materials for the linear thermoplastic phenolic resin was shown in Table 3.

TABLE 3

Raw materials for linear thermoplastic phenolic resin

| Raw materials | Amount (wt. %) | Specific materials |
|---|---|---|
| Phenolic compound | 35 | p-chloro-m-xylenol and p-tert-octyl phenol with equivalent amount |
| Aldehyde compound | 40 | Acetaldehyde |
| Organic acid salt | 0.3 | Zinc acetate |
| Polymerization inhibitor | 3 | P-benzoquinone |
| Organic solvent | 17 | Ethylene glycol |
| Coupling agent | 0.4 | Silane KH-550 |
| Toughening agent | 0.3 | Polyether sulfone |
| Modifier | 4 | Aromatic solvent oil S-200 |

Process of producing the linear thermoplastic phenolic resin was described as follows.

(1) 35% by weight of a phenolic compound, 0.3% by weight of an organic acid salt as a catalyst and 3% by weight of a molecular polymerization inhibitor were added to an enamel reactor followed by stirring, and then 40% by weight of an aldehyde compound was added to the enamel reactor.

(2) A steam valve was opened to heat the mixture, and the temperature raised to 85-90° C. in 25-30 min and was maintained at 85-90° C. for 30-40 min.

(3) The temperature further raised to 100-105° C. in 10-20 min and was maintained at 100-105° C. for 120-150 min.

(4) The mixture was subjected to vacuum dehydration until a desired level of dehydration was reached.

(5) The temperature was dropped to 70-75° C., and 17% by weight of an organic solvent, 0.3% by weight of a toughening agent and 4% by weight of a modifier were added to the enamel reactor followed by stirring for 60-90 min.

(6) The temperature was further dropped to 30-35° C., and 0.4% by weight of silane as a coupling agent was added to the enamel reactor followed by stirring for 40-60 min. The mixture prepared herein was unloaded for use.

Stage 2: Preparation of Phenol Modified Furan Resin

The raw materials for the phenol modified furan resin was shown in Table 4.

TABLE 4

Raw materials for phenol modified furan resin

| Raw materials | Amount (wt. %) | Specific materials and requirements |
| --- | --- | --- |
| Phenolic compound | 15 | Bisphenol A |
| Furfuryl alcohol | 50 | Furfuryl alcohol that includes 0.7% or less by weight of residual aldehyde, 0.3% or less by weight of water and 98% or more by weight of furfuryl alcohol, and has a cloud point of 10° C. or less and an acidity of 0.01 mol/L or less |
| Aldehyde compound | 10 | Furfural |
| Organic acid | 0.8 | Acetic acid |
| Diluent | 8 | Ethanol |
| PH regulator | 0.5 | Aqueous solution having 48 wt. % potassium hydroxide |
| Aldehyde trapping agent | 0.5 | Ammonia solution having 25-28 wt. % ammonia |
| Coupling agent | 0.8 | Silane KH-550 |
| Organic waste liquid | 6 | 54% by weight of ethylene glycol, 36% by weight of ethanol, 2% by weight of furan resin and 8% by weight of furfuryl alcohol |
| Heat stabilizer | 0.4 | Epoxy soybean oil |
| Additive | 8 | Fructose |

Process of producing the phenol modified furan resin was described as follows.

(1) 15% by weight of a phenolic compound, 10% by weight of an aldehyde compound and 0.8% by weight of an organic acid as a catalyst were added to an enamel reactor followed by stirring.

(2) A steam valve was opened to heat the mixture, and after the temperature raised to 70-75° C., 30% by weight of furfuryl alcohol was added to the enamel reactor, and the temperature was maintained at 70-75° C. for 55-60 min.

(3) The temperature raised to 80-85° C. in 10-20 minutes, and then 10% by weight of furfuryl alcohol was added to the enamel reactor, and the temperature was maintained at 80-85° C. for 60-90 min.

(4) The temperature raised to 95-100° C. in 10-20 minutes, and then 0.5% by weight of a pH regulator was added to the enamel reactor to adjust pH of the mixture to about 5.7-6.0, and 10% by weight of furfuryl alcohol was added to the enamel reactor, and the temperature was maintained at 95-100° C. for 120-150 min.

(5) At 95-100° C., 6% by weight of an organic waste liquid, 0.4% by weight of a heat stabilizer and 8% by weight of an additive were added to the enamel reactor followed by stirring for 50-60 min.

(6) The temperature was dropped to 60-65° C., and 10% by weight of a diluent was added to the enamel reactor followed by stirring for 30-60 min.

(7) The temperature was dropped to 40-45° C., and 0.5% by weight of an aldehyde trapping agent was added to the enamel reactor followed by stirring for 30-60 min.

(8) The temperature was dropped to 30-35° C., and 0.8% by weight of water-based silane as a coupling agent was added to the enamel reactor followed by stirring for 30-60 min. The mixture prepared herein was unloaded for use.

Stage 3: Preparation of Self-Curing Organic Synthetic Resin Composition for Additive Manufacturing 30% by weight of the linear thermoplastic phenolic resin prepared in stage (1) and 70% by weight of the phenol modified furan resin prepared in stage (2) were added to an enamel reactor followed by stirring. Then, the temperature raised to 35-40° C. and was maintained at 35-40° C. for 60-90 min. The mixture prepared herein was unloaded, tested and packaged to obtain the self-curing organic synthetic resin composition for additive manufacturing.

The self-curing organic synthetic resin composition prepared by this method has a viscosity of 12.0 mpa·s at 25° C., a surface tension of 33 mN/s at 20° C., an impurity content of 0.036%, a free formaldehyde content of 0.16% and a density of 1.105 g/ml at 20° C. It has a tensile strength of 2.24 MPa at normal temperature for 24 h, a tensile strength of 1.26 MPa at 1000° C. and a residual tensile strength of 0.15 MPa at 1000° C. It has a usable life of 1.4 min at 25° C.

Example 3

Stage 1: Preparation of Linear Thermoplastic Phenolic Resin

The raw materials for the linear thermoplastic phenolic resin was shown in Table 5.

TABLE 5

Raw materials for linear thermoplastic phenolic resin

| Raw materials | Amount (wt. %) | Specific materials |
| --- | --- | --- |
| Phenolic compound | 40 | P-cresol mixed with m-cresol in any proportion |
| Aldehyde compound | 35 | Dimethoxymethane mixed with o-chlorobenzaldehyde in any proportion |
| Organic acid | 0.4 | P-toluene sulfonic acid |
| Polymerization inhibitor | 2.5 | 4-tert-butylcatechol |
| Organic solvent | 16 | Ethylene glycol mixed with ethanol in any proportion |
| Coupling agent | 0.5 | Silane KH-560 mixed with silane KH-550 in any proportion |
| Toughening agent | 0.6 | Polyphenylene ether ketone |
| Modifier | 5 | Aromatic solvent oil S-150 |

Process of producing the linear thermoplastic phenolic resin was described as follows.

(1) 40% by weight of a phenolic compound, 0.4% by weight of an organic acid or an organic acid salt as a catalyst and 2.5% by weight of a molecular polymerization inhibitor were added to an enamel reactor followed by stirring, and then 35% by weight of an aldehyde compound was added to the enamel reactor.

(2) A steam valve was opened to heat the mixture, and the temperature raised to 85-90° C. in 25-30 min and was maintained at 85-90° C. for 30-40 min.

(3) The temperature further raised to 100-105° C. in 10-20 min and was maintained at 100-105° C. for 120-150 min.

(4) The mixture was subjected to vacuum dehydration until a desired level of dehydration was reached.

(5) The temperature was dropped to 70-75° C., and 16% by weight of an organic solvent, 0.6% by weight of a toughening agent and 5% by weight of a modifier were added to the enamel reactor followed by stirring for 60-90 min.

(6) The temperature was further dropped to 30-35° C., and 0.5% by weight of silane as a coupling agent was added to the enamel reactor followed by stirring for 40-60 min. The mixture prepared herein was unloaded for use.

Stage 2: Preparation of Phenol Modified Furan Resin

The raw materials of the phenol modified furan resin was shown in Table 6.

to the enamel reactor to adjust pH of the mixture to about 5.7-6.0, and 11% by weight of furfuryl alcohol was added to the enamel reactor, and the temperature was maintained at 95-100° C. for 120-150 min.

(5) At 95-100° C., 4% by weight of an organic waste liquid, 0.5% by weight of a heat stabilizer and 4% by weight of an additive were added to the enamel reactor followed by stirring for 50-60 min.

(6) The temperature was dropped to 60-65° C., and 10% by weight of a diluent was added to the enamel reactor followed by stirring for 30-60 min.

(7) The temperature was dropped to 40-45° C., and 0.4% by weight of an aldehyde trapping agent was added to the enamel reactor followed by stirring for 30-60 min.

(8) The temperature was dropped to 30-35° C., and 1.1% by weight of water-based silane as a coupling agent was added to the enamel reactor followed by stirring for 30-60 min. The mixture prepared herein was unloaded for use.

Stage 3: Preparation of Self-Curing Organic Synthetic Resin Composition for Additive Manufacturing 40% by weight of the linear thermoplastic phenolic resin prepared in stage (1) and 60% by weight of the phenol

TABLE 6

Raw materials of phenol modified furan resin

| Raw materials | Amount (wt. %) | Specific materials and requirements |
| --- | --- | --- |
| Phenolic compound | 14 | P-cresol, m-cresol and o-cresol with equivalent amount |
| Furfuryl alcohol | 52 | Furfuryl alcohol that includes 0.7% or less by weight of residual aldehyde, 0.3% or less by weight of water and 98% or more by weight of furfuryl alcohol, and has a cloud point of 10° C. or less and an acidity of 0.01 mol/L or less |
| Aldehyde compound | 13 | Acetaldehyde, paraformaldehyde powders and benzaldehyde with equivalent amount |
| Organic acid | 0.6 | Benzoic acid and phthalic acid in a weight ratio of 1:2 |
| Diluent | 10 | Ethylene glycol, toluene and petroleum ether in a weight ratio of 1:2:2 |
| PH regulator | 0.4 | Aqueous solution having 48 wt. % sodium hydroxide |
| Aldehyde trapping agent | 0.4 | Ammonia solution having 25 wt. % ammonia |
| Coupling agent | 1.1 | Silane KH-602 |
| Organic waste liquid | 4 | 54% by weight of ethylene glycol, 36% by weight of ethanol, 2% by weight of furan resin and 8% by weight of furfuryl alcohol |
| Heat stabilizer | 0.5 | Pentaerythritol, xylitol and mannitol in any proportion |
| Additive | 4 | Syrup and fructose in a weight ratio of 1:4 |

Process of producing the phenol modified furan resin was described as follows.

(1) 14% by weight of a phenolic compound, 13% by weight of an aldehyde compound and 0.6% by weight of an organic acid as a catalyst were added to an enamel reactor followed by stirring.

(2) A steam valve was opened to heat the mixture, and after the temperature raised to 70-75° C., 30% by weight of furfuryl alcohol was added to the enamel reactor, and the temperature was maintained at 70-75° C. for 55-60 min.

(3) The temperature raised to 80-85° C. in 10-20 minutes, and then 11% by weight of furfuryl alcohol was added to the enamel reactor, and the temperature was maintained at 80-85° C. for 60-90 min.

(4) The temperature raised to 95-100° C. in 10-20 minutes, and then 0.4% by weight of a pH regulator was added modified furan resin prepared in stage (2) were added to an enamel reactor followed by stirring. Then, the temperature raised to 35-40° C. and was maintained at 35-40° C. for 60-90 min. The mixture prepared herein was unloaded, tested and packaged to obtain the self-curing organic synthetic resin composition for additive manufacturing.

The self-curing organic synthetic resin composition prepared by this method has a viscosity of 10.8 mpa·s at 25° C., a surface tension of 36 mN/s at 20° C., an impurity content of 0.043%, a free formaldehyde content of 0.19% and a density of 1.066 g/ml at 20° C. It has a tensile strength of 2.09 MPa at normal temperature for 24 h, a tensile strength of 1.35 MPa at 1000° C. and a residual tensile strength of 0.14 MPa at 1000° C. It has a usable life of 1.6 min at 25° C.

Example 4

Stage 1: Preparation of Linear Thermoplastic Phenolic Resin

The raw materials for the linear thermoplastic phenolic resin was shown in Table 7.

TABLE 7

Raw materials of linear thermoplastic phenolic resin

| Raw materials | Amount (wt. %) | Specific materials |
|---|---|---|
| Phenolic compound | 30 | P-chloro-m-xylenol |
| Aldehyde compound | 40 | Metaldehyde |
| Organic acid salt | 0.5 | Magnesium acetate, sodium benzoate, calcium propionate in any proportion |
| Polymerization inhibitor | 2 | Hydroquinone and p-benzoquinone in a weight ratio of 1:2 |
| Organic solvent | 24 | Methanol, ethylene glycol, ethanol, acetone, isopropanol, methyl butanone in any proportion |
| Coupling agent | 0.8 | Any of silane KH-560, silane KH-550 and silane KH-602 |
| Toughening agent | 0.7 | Polyvinyl butyral, polyether sulfone, polyphenylene ether ketone, polyvinyl alcohol in any proportion |
| Modifier | 2 | Aromatic solvent oil S-100 |

Process of producing the linear thermoplastic phenolic resin was described as follows.

(1) 30% by weight of a phenolic compound, 0.5% by weight of an organic acid or an organic acid salt as a catalyst and 2% by weight of a molecular polymerization inhibitor were added to an enamel reactor followed by stirring, and then 40% by weight of an aldehyde compound was added to the enamel reactor.

(2) A steam valve was opened to heat the mixture, and the temperature raised to 85-90° C. in 25-30 min and was maintained at 85-90° C. for 30-40 min.

(3) The temperature further raised to 100-105° C. in 10-20 min and was maintained at 100-105° C. for 120-150 min.

(4) The mixture was subjected to vacuum dehydration until a desired level of dehydration was reached.

(5) The temperature was dropped to 70-75° C., and 24% by weight of an organic solvent, 0.7% by weight of a toughening agent and 2% by weight of a modifier were added to the enamel reactor followed by stirring for 60-90 min.

(6) The temperature was further dropped to 30-35° C., and 0.8% by weight of silane as a coupling agent was added to the enamel reactor followed by stirring for 40-60 min. The mixture prepared herein was unloaded for use.

Stage 2: Preparation of Phenol Modified Furan Resin

The raw materials for the phenol modified furan resin was shown in Table 8.

TABLE 8

Raw materials for phenol modified furan resin

| Raw materials | Amount (wt. %) | Specific materials and requirements |
|---|---|---|
| Phenolic compound | 20 | Phenol, bisphenol A, p-cresol, m-cresol, o-cresol, 3-methyl-4-isopropylphenol, 3-methyl-5-ethylphenol, 2,6-di-tert-butyl-4-ethylphenol in any proportion |
| Furfuryl alcohol | 45 | Furfuryl alcohol that includes 0.7% or less by weight of residual aldehyde, 0.3% or less by weight of water and 98% or more by weight of furfuryl alcohol, and has a cloud point of 10° C. or less and an acidity of 0.01 mol/L or less |
| Aldehyde compound | 10 | Furfural, acetaldehyde, paraformaldehyde powders, benzaldehyde with an equivalent amount |
| Organic acid | 1 | Formic acid, acetic acid, citric acid, benzoic acid, phthalic acid, oxalic acid, malonic acid, phenylacetic acid, succinic acid in any proportion |
| Diluent | 12 | Methanol, ethanol, isopropanol, furfuryl alcohol, ethylene glycol, toluene, petroleum ether in any proportion |
| PH regulator | 0.4 | Aqueous solution having 48 wt. % sodium hydroxide and potassium hydroxide |
| Aldehyde trapping agent | 0.3 | Ammonia solution having 28 wt. % ammonia |
| Coupling agent | 1.3 | Silane KH-560 and silane KH-550 in any proportion |
| Organic waste liquid | 5 | 54% by weight of ethylene glycol, 36% by weight of ethanol, 2% by weight of furan resin and 8% by weight of furfuryl alcohol |
| Heat stabilizer | 0.5 | Phosphite, epoxy soybean oil, epoxy ester, pentaerythritol, xylitol, mannitol with an equivalent amount |
| Additive | 4.5 | Fructose |

Process of producing the phenol modified furan resin was described as follows.

(1) 20% by weight of a phenolic compound, 10% by weight of an aldehyde compound and 1% by weight of an organic acid as a catalyst were added to an enamel reactor followed by stirring.

(2) A steam valve was opened to heat the mixture, and after the temperature raised to 70-75° C., 25% by weight of furfuryl alcohol was added to the enamel reactor, and the temperature was maintained at 70-75° C. for 55-60 min.

(3) The temperature raised to 80-85° C. in 10-20 minutes, and then 10% by weight of furfuryl alcohol was added to the enamel reactor, and the temperature was maintained at 80-85° C. for 60-90 min.

(4) The temperature raised to 95-100° C. in 10-20 minutes, and then 0.4% by weight of a pH regulator was added to the enamel reactor to adjust pH of the mixture to about 5.7-6.0, and 10% by weight of furfuryl alcohol was added to the enamel reactor, and the temperature was maintained at 95-100° C. for 120-150 min.

(5) At 95-100° C., 5% by weight of an organic waste liquid, 0.5% by weight of a heat stabilizer and 4.5% by weight of an additive were added to the enamel reactor followed by stirring for 50-60 min.

(6) The temperature was dropped to 60-65° C., and 12% by weight of a diluent was added to the enamel reactor followed by stirring for 30-60 min.

(7) The temperature was dropped to 40-45° C., and 0.3% by weight of an aldehyde trapping agent was added to the enamel reactor followed by stirring for 30-60 min.

(8) The temperature was dropped to 30-35° C., and 1.3% by weight of water-based silane as a coupling agent was added to the enamel reactor followed by stirring for 30-60 min. The mixture prepared herein was unloaded for use.

Stage 3: Preparation of Self-Curing Organic Synthetic Resin Composition for Additive Manufacturing 32% by weight of the linear thermoplastic phenolic resin prepared in stage (1) and 68% by weight of the phenol modified furan resin prepared in stage (2) were added to an enamel reactor followed by stirring. Then, the temperature raised to 35-40° C. and was maintained at 35-40° C. for 60-90 min. The mixture prepared herein was unloaded, tested and packaged to obtain the self-curing organic synthetic resin composition for additive manufacturing.

The self-curing organic synthetic resin composition prepared by this method has a viscosity of 12.6 mpa·s at 25° C., a surface tension of 33 mN/s at 20° C., an impurity content of 0.051%, a free formaldehyde content of 0.21% and a density of 1.114 g/ml at 20° C. It has a tensile strength of 2.20 MPa at normal temperature for 24 h, a tensile strength of 1.27 MPa at 1000° C. and a residual tensile strength of 0.17 MPa at 1000° C. It has a usable life of 1.5 min at 25° C.

Example 5

Stage 1: Preparation of Linear Thermoplastic Phenolic Resin

The Raw materials for the linear thermoplastic phenolic resin was shown in Table 9.

TABLE 9

| Raw materials for linear thermoplastic phenolic resin | | |
|---|---|---|
| Raw materials | Amount (wt. %) | Specific materials |
| Phenolic compound | 38 | P-nitrophenol |
| Aldehyde compound | 44 | Valeraldehyde |
| Organic acid salt | 0.2 | Aluminum acrylate |
| Polymerization inhibitor | 2 | Phenothiazine |
| Organic solvent | 13 | Isopropanol |
| Coupling agent | 0.4 | Silane KH-602 |
| Toughening agent | 0.4 | Polyphenylene ether ketone |
| Modifier | 2 | Aromatic solvent oil S-150 |

Process of producing the linear thermoplastic phenolic resin was described as follows.

(1) 38% by weight of a phenolic compound, 0.2% by weight of an organic acid or an organic acid salt as a catalyst and 2% by weight of a molecular polymerization inhibitor were added to an enamel reactor followed by stirring, and then 44% by weight of an aldehyde compound was added to the enamel reactor.

(2) A steam valve was opened to heat the mixture, and the temperature raised to 85-90° C. in 25-30 min and was maintained at 85-90° C. for 30-40 min.

(3) The temperature further raised to 100-105° C. in 10-20 min and was maintained at 100-105° C. for 120-150 min.

(4) The mixture was subjected to vacuum dehydration until a desired level of dehydration was reached.

(5) The temperature was dropped to 70-75° C., and 13% by weight of an organic solvent, 0.4% by weight of a toughening agent and 2% by weight of a modifier were added to the enamel reactor followed by stirring for 60-90 min.

(6) The temperature was further dropped to 30-35° C., and 0.4% by weight of silane as a coupling agent was added to the enamel reactor followed by stirring for 40-60 min. The mixture prepared herein was unloaded for use.

Stage 2: Preparation of Phenol Modified Furan Resin

The Raw materials for the phenol modified furan resin was shown in Table 10.

TABLE 10

| Raw materials for phenol modified furan resin | | |
|---|---|---|
| Raw materials | Amount (wt. %) | Specific materials and requirements |
| Phenolic compound | 25 | 2,6-di-tert-butyl-4-ethylphenol |
| Furfuryl alcohol | 50 | Furfuryl alcohol that includes 0.7% or less by weight of residual aldehyde, 0.3% or less by weight of water and 98% or more by weight of furfuryl alcohol, and has a cloud point of 10° C. or less and an acidity of 0.01 mol/L or less |

TABLE 10-continued

Raw materials for phenol modified furan resin

| Raw materials | Amount (wt. %) | Specific materials and requirements |
| --- | --- | --- |
| Aldehyde compound | 8 | Citral |
| Organic acid | 0.5 | Malonic acid and phenylacetic acid in a weight ratio of 1:3 |
| Diluent | 8 | methanol, ethanol and ethylene glycol with an equivalent amount |
| PH regulator | 0.4 | Aqueous solution having 48 wt. % sodium hydroxide |
| Aldehyde trapping agent | 0.5 | Ammonia solution having 25-28 wt. % ammonia |
| Coupling agent | 0.6 | Silane KH-560 |
| Heat stabilizer | 0.5 | Mannitol |
| Additive | 6.5 | Syrup |

Process of producing the phenol modified furan resin was described as follows.

(1) 25% by weight of a phenolic compound, 8% by weight of an aldehyde compound and 0.5% by weight of an organic acid as a catalyst were added to an enamel reactor followed by stirring.

(2) A steam valve was opened to heat the mixture, and after the temperature raised to 70-75° C., 30% by weight of furfuryl alcohol was added to the enamel reactor, and the temperature was maintained at 70-75° C. for 55-60 min.

(3) The temperature raised to 80-85° C. in 10-20 minutes, and then 10% by weight of furfuryl alcohol was added to the enamel reactor, and the temperature was maintained at 80-85° C. for 60-90 min.

(4) The temperature raised to 95-100° C. in 10-20 minutes, and then 0.4% by weight of a pH regulator was added to the enamel reactor to adjust pH of the mixture to about 5.7-6.0, and 10% by weight of furfuryl alcohol was added to the enamel reactor, and the temperature was maintained at 95-100° C. for 120-150 min.

(5) At 95-100° C., 0.5% by weight of a heat stabilizer and 6.5% by weight of an additive were added to the enamel reactor followed by stirring for 50-60 min.

(6) The temperature was dropped to 60-65° C., and 8% by weight of a diluent was added to the enamel reactor followed by stirring for 30-60 min.

(7) The temperature was dropped to 40-45° C., and 0.5% by weight of an aldehyde trapping agent was added to the enamel reactor followed by stirring for 30-60 min.

(8) The temperature was dropped to 30-35° C., and 0.6% by weight of water-based silane as a coupling agent was added to the enamel reactor followed by stirring for 30-60 min. The mixture prepared herein was unloaded for use.

Stage 3: Preparation of Self-Curing Organic Synthetic Resin Composition for Additive Manufacturing 34% by weight of the linear thermoplastic phenolic resin prepared in stage (1) and 66% by weight of the phenol modified furan resin prepared in stage (2) were added to an enamel reactor followed by stirring. Then, the temperature raised to 35-40° C. and was maintained at 35-40° C. for 60-90 min. The mixture prepared herein was unloaded, tested and packaged to obtain the self-curing organic synthetic resin composition for additive manufacturing.

The self-curing organic synthetic resin composition prepared by this method has a viscosity of 11.9 mpa·s at 25° C., a surface tension of 32 mN/s at 20° C., an impurity content of 0.024%, a free formaldehyde content of 0.22% and a density of 1.124 g/ml at 20° C. It has a tensile strength of 2.28 MPa at normal temperature for 24 h, a tensile strength of 1.35 MPa at 1000° C. and a residual tensile strength of 0.11 MPa at 1000° C. It has a usable life of 1.6 min at 25° C.

Example 6

The self-curing organic synthetic resin composition was prepared through three stages. In which, a linear thermoplastic phenolic resin prepared in stage (1) and a phenol modified furan resin prepared in stage (2) were mixed in a certain weight ratio in stage (3) to obtain the self-curing organic synthetic resin composition for additive manufacturing.

Stage 1: Preparation of the Linear Thermoplastic Phenolic Resin

The raw materials for the linear thermoplastic phenolic resin was shown in Table 11.

TABLE 11

Raw materials for linear thermoplastic phenolic resin

| Raw materials | Amount (wt. %) | Specific materials |
| --- | --- | --- |
| Phenolic compound | 15 | P-aminophenol |
| Aldehyde compound | 60 | Valeraldehyde |
| Organic acid | 0.8 | Benzoic acid |
| Polymerization inhibitor | 4 | 4-tert-butylcatechol |
| Organic solvent | 13.6 | Acetone |
| Coupling agent | 0.9 | Silane KH-560 |
| Toughening agent | 0.7 | Polyether sulfone |
| Modifier | 5 | Aromatic solvent oil S-200 |

Process of producing the linear thermoplastic phenolic resin was described as follows.

(1) A phenolic compound, an organic acid or an organic acid salt as a catalyst, and a molecular polymerization inhibitor were added to an enamel reactor followed by stirring, and then an aldehyde compound was added to the enamel reactor.

(2) A steam valve was opened to heat the mixture, and the temperature raised to 85-90° C. in 25-30 min and was maintained at 85-90° C. for 30-40 min.

(3) The temperature further raised to 100-105° C. in 10-20 min and was maintained at 100-105° C. for 120-150 min.

(4) The mixture was subjected to vacuum dehydration until a desired level of dehydration was reached.

(5) The temperature was dropped to 70-75° C., and an organic solvent, a toughening agent and a modifier were added to the enamel reactor followed by stirring for 60-90 min.

(6) The temperature was further dropped to 30-35° C., and a coupling agent was added to the enamel reactor followed by stirring for 40-60 min. The mixture prepared herein was unloaded for use.

Stage 2: Preparation of the Phenol Modified Furan Resin

The raw materials for the phenol modified furan resin was shown in Table 12.

TABLE 12

Raw materials for phenol modified furan resin

| Raw materials | Amount (wt. %) | Specific materials and requirements |
|---|---|---|
| Phenolic compound | 12 | M-cresol |
| Furfuryl alcohol | 70 | Furfuryl alcohol that includes 0.7% or less by weight of residual aldehyde, 0.3% or less by weight of water and 98% or more by weight of furfuryl alcohol, and has a cloud point of 10° C. or less and an acidity of 0.01 mol/L or less |
| Aldehyde compound | 5 | Phenyl acetaldehyde |
| Organic acid | 12 | Phenylacetic acid |
| Diluent | 4 | Isopropanol |
| PH regulator | 0.7 | Aqueous solution having 48 wt. % sodium hydroxide |
| Aldehyde trapping agent | 0.7 | Ammonia solution having 25-28 wt. % ammonia |
| Coupling agent | 0.3 | Silane KH-602 |
| Organic waste liquid | 2 | 54% by weight of ethylene glycol, 36% by weight of ethanol, 2% by weight of furan resin and 8% by weight of furfuryl alcohol |
| Heat stabilizer | 0.6 | Pentaerythritol |
| Additive | 3.5 | Syrup and fructose in a weight ratio of 2:1 |

Process of producing the phenol modified furan resin was described as follows.

(1) A phenolic compound, an aldehyde compound and an organic acid as a catalyst were added to an enamel reactor followed by stirring.

(2) A steam valve was opened to heat the mixture, and after the temperature raised to 70-75° C., half of furfuryl alcohol was added to the enamel reactor, and the temperature was maintained at 70-75° C. for 55-60 min.

(3) The temperature raised to 80-85° C. in 10-20 minutes, and then a quarter of furfuryl alcohol was added to the enamel reactor, and the temperature was maintained at 80-85° C. for 60-90 min.

(4) The temperature raised to 95-100° C. in 10-20 minutes, and then a pH regulator was added to the enamel reactor, and a quarter of furfuryl alcohol was added to the enamel reactor, and the temperature was maintained at 95-100° C. for 120-150 min.

(5) At 95-100° C., an organic waste liquid, a heat stabilizer and an additive were added to the enamel reactor followed by stirring for 50-60 min.

(6) The temperature was dropped to 60-65° C., and a diluent was added to the enamel reactor followed by stirring for 30-60 min.

(7) The temperature was dropped to 40-45° C., and an aldehyde trapping agent was added to the enamel reactor followed by stirring for 30-60 min.

(8) The temperature was dropped to 30-35° C., and a coupling agent was added to the enamel reactor followed by stirring for 30-60 min. The mixture prepared herein was unloaded for use.

Stage 3: Preparation of the Self-Curing Organic Synthetic Resin Composition for Additive Manufacturing 30% by weight of the linear thermoplastic phenolic resin prepared in stage (1) and 70% by weight of the phenol modified furan resin prepared in stage (2) were added to an enamel reactor followed by stirring. Then, the temperature raised to 35-40° C. and was maintained at 35-40° C. for 60-90 min. The mixture prepared herein was unloaded, tested and packaged to obtain the self-curing organic synthetic resin composition for additive manufacturing.

Example 7

Compared to Example 6, Example 7 used different raw materials of a linear thermoplastic phenolic resin (as shown in Table 13) and different raw materials of a phenol modified furan resin (as shown in Table 14).

Methods for preparing the linear thermoplastic phenolic resin, the phenol modified furan resin and a self-curing organic synthetic resin composition for additive manufacturing in Example 7 were the same as those in Example 6.

TABLE 13

Raw materials for linear thermoplastic phenolic resin

| Raw materials | Amount (wt. %) | Specific materials |
|---|---|---|
| Phenolic compound | 39.4 | P-nitrophenol |
| Aldehyde compound | 30 | Metaldehyde |
| Organic acid or organic acid salt | 0.2 | Propionic acid |
| Polymerization inhibitor | 1 | Phenothiazine |
| Organic solvent | 28 | Methyl butanone |
| Coupling agent | 0.3 | Silane KH-550 |
| Toughening agent | 0.1 | Polyphenylene ether ketone |
| Modifier | 1 | Aromatic solvent oil S-100 |

TABLE 14

Raw materials for phenol modified furan resin

| Raw materials | Amount (wt. %) | Specific materials and requirements |
|---|---|---|
| Phenolic compound | 15 | 3-methyl-5-ethylphenol |
| Furfuryl alcohol | 33.5 | Furfuryl alcohol that includes 0.7% or less by weight of residual aldehyde, 0.3% or less by weight of water and 98% or more by weight of furfuryl alcohol, and has a cloud point of 10° C. or less and an acidity of 0.01 mol/L or less |
| Aldehyde compound | 12 | Citral |
| Organic acid | 1.2 | Malonic acid |
| Diluent | 16 | Isopropanol |
| PH regulator | 0.7 | Aqueous solution having 48 wt. % potassium hydroxide |
| Aldehyde trapping agent | 0.7 | Ammonia solution having 25-28 wt. % ammonia |
| Coupling agent | 1.3 | Silane KH-560 |
| Organic waste liquid | 10 | 54% by weight of ethylene glycol, 36% by weight of ethanol, 2% by weight of furan resin and 8% by weight of furfuryl alcohol |
| Heat stabilizer | 0.6 | Pentaerythritol |
| Additive | 9 | Syrup |

Example 8

Compared to Example 6, Example 8 used different raw materials of a linear thermoplastic phenolic resin (as shown in Table 15) and different raw materials of a phenol modified furan resin (as shown in Table 16).

Methods for preparing the linear thermoplastic phenolic resin, the phenol modified furan resin and a self-curing organic synthetic resin composition for additive manufacturing in Example 8 were the same as those in Example 6.

TABLE 15

Raw materials for linear thermoplastic phenolic resin

| Raw materials | Amount (wt. %) | Specific materials |
|---|---|---|
| Phenolic compound | 45 | Phenol and p-chloro-m-xylenol in any proportion |
| Aldehyde compound | 33.9 | Dimethoxymethane and o-chlorobenzaldehyde in a weight ratio of 2:1 |
| Organic acid or organic acid salt | 0.3 | Formic acid, magnesium acetate and sodium benzoate in any proportion |
| Polymerization inhibitor | 3 | P-benzoquinone |
| Organic solvent | 15 | Methyl butanone |
| Coupling agent | 0.6 | Silane KH-602 |
| Toughening agent | 0.2 | Polyvinyl alcohol |
| Modifier | 2 | Aromatic solvent oil S-100 |

TABLE 16

Raw materials for phenol modified furan resin

| Raw materials | Amount (wt. %) | Specific materials and requirements |
|---|---|---|
| Phenolic compound | 16.3 | Phenol, 3-methyl-4-isopropylphenol and 3-methyl-5-ethylphenol with an equivalent amount |
| Furfuryl alcohol | 45 | Furfuryl alcohol that includes 0.7% or less by weight of residual aldehyde, 0.3% or less by weight of water and 98% or more by weight of furfuryl alcohol, and has a cloud point of 10° C. or less and an acidity of 0.01 mol/L or less |
| Aldehyde compound | 15 | Aqueous formaldehyde solution having 36.5 wt. % formaldehyde |
| Organic acid | 0.6 | Phthalic acid |
| Diluent | 5 | Toluene and petroleum ether in any proportion |
| PH regulator | 0.3 | Aqueous solution having 48 wt. % sodium hydroxide and potassium hydroxide |

TABLE 16-continued

Raw materials for phenol modified furan resin

| Raw materials | Amount (wt. %) | Specific materials and requirements |
|---|---|---|
| Aldehyde trapping agent | 0.3 | Ammonia solution having 25-28 wt. % ammonia |
| Coupling agent | 0.3 | Silane KH-560 |
| Organic waste liquid | 9 | 54% by weight of ethylene glycol, 36% by weight of ethanol, 2% by weight of furan resin and 8% by weight of furfuryl alcohol |
| Heat stabilizer | 0.2 | Mannitol |
| Additive | 8 | Syrup and fructose in a weight ratio of 1:3 |

Example 9

Compared to Example 6, Example 9 used different raw materials of a linear thermoplastic phenolic resin (as shown in Table 17) and different raw materials of a phenol modified furan resin (as shown in Table 18).

Methods for preparing the linear thermoplastic phenolic resin, the phenol modified furan resin and a self-curing organic synthetic resin composition for additive manufacturing in Example 9 were the same as those in Example 6.

TABLE 17

Raw materials for linear thermoplastic phenolic resin

| Raw materials | Amount (wt. %) | Specific materials |
|---|---|---|
| Phenolic compound | 20 | Phenol and p-tert-octyl phenol with an equivalent amount |
| Aldehyde compound | 59.9 | Formaldehyde, acetaldehyde, butyraldehyde and valeraldehyde with an equivalent amount |
| Organic acid or organic acid salt | 0.5 | Formic acid, acetic acid, p-toluene sulfonic acid, acrylic acid, benzoic acid and propionic acid with an equivalent amount |
| Polymerization inhibitor | 2 | Hydroquinone, p-benzoquinone, 4-tert-butylcatechol and phenothiazine with an equivalent amount |
| Organic solvent | 13.6 | Methanol, ethylene glycol, ethanol, acetone, isopropanol and methyl butanone with an equivalent amount |
| Coupling agent | 0.7 | Silane KH-560, silane KH-550 and silane KH-602 with an equivalent amount |
| Toughening agent | 0.3 | Polyvinyl butyral, polyether sulfone, polyphenylene ether ketone and polyvinyl alcohol with an equivalent amount |
| Modifier | 3 | Aromatic solvent oil S-150 |

TABLE 18

Raw materials for phenol modified furan resin

| Raw materials | Amount (wt. %) | Specific materials and requirements |
|---|---|---|
| Phenolic compound | 21 | 2,6-di-tert-butyl-4-ethylphenol |
| Furfuryl alcohol | 50 | Furfuryl alcohol that includes 0.7% or less by weight of residual aldehyde, 0.3% or less by weight of water and 98% or more by weight of furfuryl alcohol, and has a cloud point of 10° C. or less and an acidity of 0.01 mol/L or less |
| Aldehyde compound | 5 | Furfural, acetaldehyde, paraformaldehyde powders, benzaldehyde and phenylacetaldehyde with an equivalent amount |
| Organic acid | 0.5 | Formic acid, acetic acid, citric acid, benzoic acid, phthalic acid, oxalic acid, malonic acid, phenylacetic acid and succinic acid with an equivalent amount |
| Diluent | 8 | Methanol, ethanol, isopropanol, furfuryl alcohol, ethylene glycol, toluene, petroleum ether |
| PH regulator | 0.4 | Aqueous solution having 48 wt. % potassium hydroxide |

TABLE 18-continued

Raw materials for phenol modified furan resin

| Raw materials | Amount (wt. %) | Specific materials and requirements |
|---|---|---|
| Aldehyde trapping agent | 0.4 | Ammonia solution having 25-28 wt. % ammonia |
| Coupling agent | 0.4 | Silane KH-560 |
| Organic waste liquid | 8 | 54% by weight of ethylene glycol, 36% by weight of ethanol, 2% by weight of furan resin and 8% by weight of furfuryl alcohol |
| Heat stabilizer | 0.3 | Phosphite, epoxy soybean oil, epoxy ester, pentaerythritol, xylitol and mannitol with an equivalent amount |
| Additive | 6 | Fructose |

Example 10

Compared to Example 6, Example 10 used different raw materials of the linear thermoplastic phenolic resin (as shown in Table 19) and different raw materials of the phenol modified furan resin (as shown in Table 20).

Methods for preparing the linear thermoplastic phenolic resin, the phenol modified furan resin and a self-curing organic synthetic resin composition for additive manufacturing in Example 10 were the same as those in Example 6.

TABLE 19

Raw materials for linear thermoplastic phenolic resin

| Raw materials | Amount (wt. %) | Specific materials |
|---|---|---|
| Phenolic compound | 30 | P-cresol |
| Aldehyde compound | 43.6 | Butyraldehyde |
| Organic acid or organic acid salt | 0.6 | P-toluene sulfonic acid |
| Polymerization inhibitor | 2.5 | P-benzoquinone |
| Organic solvent | 18 | Isopropanol and methyl butanone in a weight ratio of 1:2 |
| Coupling agent | 0.8 | Silane KH-560 and silane KH-550 in any proportion |
| Toughening agent | 0.5 | Polyvinyl butyral |
| Modifier | 4 | Aromatic solvent oil S-150 |

TABLE 20

Raw materials for phenol modified furan resin

| Raw materials | Amount (wt. %) | Specific materials and requirements |
|---|---|---|
| Phenolic compound | 20.8 | O-cresol |
| Furfuryl alcohol | 54.5 | Furfuryl alcohol that includes 0.7% or less by weight of residual aldehyde, 0.3% or less by weight of water and 98% or more by weight of furfuryl alcohol, and has a cloud point of 10° C. or less and an acidity of 0.01 mol/L or less |
| Aldehyde compound | 7 | Benzaldehyde |
| Organic acid | 0.4 | Oxalic acid |
| Diluent | 6 | Toluene |
| PH regulator | 0.3 | Aqueous solution having 48 wt. % sodium hydroxide |
| Aldehyde trapping agent | 0.5 | Ammonia solution having 25-28 wt. % ammonia |
| Coupling agent | 0.3 | Silane KH-550 |
| Organic waste liquid | 5 | 54% by weight of ethylene glycol, 36% by weight of ethanol, 2% by weight of furan resin and 8% by weight of furfuryl alcohol |

Example 11

Compared to Example 6, Example 11 used different raw materials of the linear thermoplastic phenolic resin (as shown in Table 21) and different raw materials of the phenol modified furan resin (as shown in Table 22).

Methods for preparing the linear thermoplastic phenolic resin, the phenol modified furan resin and a self-curing organic synthetic resin composition for additive manufacturing in Example 11 were the same as those in Example 6.

TABLE 21

Raw materials for linear thermoplastic phenolic resin

| Raw materials | Amount (wt. %) | Specific materials |
|---|---|---|
| Phenolic compound | 40 | P-nitrophenol |
| Aldehyde compound | 41.8 | Metaldehyde |
| Organic acid salt | 0.7 | Sodium benzoate |
| Polymerization inhibitor | 1 | 4-tert-butylcatechol |
| Organic solvent | 10 | Isopropanol |
| Coupling agent | 0.9 | Silane KH-602 |
| Toughening agent | 0.6 | Polyether sulfone |
| Modifier | 5 | Aromatic solvent oil S-200 |

TABLE 22

Raw materials for phenol modified furan resin

| Raw materials | Amount (wt. %) | Specific materials and requirements |
|---|---|---|
| Phenolic compound | 24 | P-cresol, m-cresol and o-cresol with an equivalent amount |
| Furfuryl alcohol | 60.7 | Furfuryl alcohol that includes 0.7% or less by weight of residual aldehyde, 0.3% or less by weight of water and 98% or more by weight of furfuryl alcohol, and has a cloud point of 10° C. or less and an acidity of 0.01 mol/L or less |
| Aldehyde compound | 5 | Furfural |
| Organic acid | 0.8 | Citric acid |
| Diluent | 4 | Isopropanol |
| PH regulator | 0.4 | Aqueous solution having 48 wt. % sodium hydroxide |
| Aldehyde trapping agent | 0.5 | Ammonia solution having 26 wt. % ammonia |
| Coupling agent | 0.3 | Silane KH-602 |
| Organic waste liquid | 1 | 54% by weight of ethylene glycol, 36% by weight of ethanol, 2% by weight of furan resin and 8% by weight of furfuryl alcohol |
| Heat stabilizer | 0.3 | Xylitol |
| Additive | | Fructose |

TABLE 20-continued

Raw materials for phenol modified furan resin

| Raw materials | Amount (wt. %) | Specific materials and requirements |
|---|---|---|
| Heat stabilizer | 0.2 | Pentaerythritol |
| Additive | 5 | Syrup |

Example 12

Compared to Example 6, Example 12 used different raw materials of the linear thermoplastic phenolic resin (as shown in Table 23) and different raw materials of the phenol modified furan resin (as shown in Table 24).

Methods for preparing the linear thermoplastic phenolic resin, the phenol modified furan resin and a self-curing organic synthetic resin composition for additive manufacturing in Example 12 were the same as those in Example 6.

TABLE 23

Raw materials for linear thermoplastic phenolic resin

| Raw materials | Amount (wt. %) | Specific materials |
|---|---|---|
| Phenolic compound | 45 | P-chloro-m-xylenol and p-tert-octyl phenol in a weight ratio of 1:3 |
| Aldehyde compound | 30 | Formaldehyde and acetaldehyde with equivalent amount |
| Organic acid or organic acid salt | 0.8 | Formic acid and aluminum acrylate in a weight ratio of 1:5 |

TABLE 23-continued

Raw materials for linear thermoplastic phenolic resin

| Raw materials | Amount (wt. %) | Specific materials |
|---|---|---|
| Polymerization inhibitor | 4 | P-benzoquinone, 4-tert-butylcatechol in a weight ratio of 1:2 |
| Organic solvent | 15.1 | Ethanol and isopropanol in a weight ratio of 1:5 |
| Coupling agent | 0.9 | Silane KH-560 and Silane KH-602 in a weight ratio of 1:35 |
| Toughening agent | 0.7 | Polyether sulfone and polyvinyl alcohol in a weight ratio of 1:4 |
| Modifier | 3.5 | Aromatic solvent oil S-200 |

TABLE 24

Raw materials for phenol modified furan resin

| Raw materials | Amount (wt. %) | Specific materials and requirements |
|---|---|---|
| Phenolic compound | 28 | Bisphenol A and 3-methyl-5-ethylphenol in a weight ratio of 1:2 |
| Furfuryl alcohol | 20 | Furfuryl alcohol that includes 0.7% or less by weight of residual aldehyde, 0.3% or less by weight of water and 98% or more by weight of furfuryl alcohol, and has a cloud point of 10° C. or less and an acidity of 0.01 mol/L or less |
| Aldehyde compound | 14.7 | Acetaldehyde and benzaldehyde with equivalent amount |
| Organic acid | 1.2 | Acetic acid and phenylacetic acid in a weight ratio of 1:4 |
| Diluent | 15 | Isopropanol and toluene in a weight ratio of 1:3 |
| PH regulator | 0.7 | Aqueous solution having 48 wt. % sodium hydroxide |
| Aldehyde trapping agent | 0.7 | Ammonia solution having 25-28 wt. % ammonia |
| Coupling agent | 1.1 | Silane KH-560 |
| Organic waste liquid | 10 | 54% by weight of ethylene glycol, 36% by weight of ethanol, 2% by weight of furan resin and 8% by weight of furfuryl alcohol |
| Heat stabilizer | 0.6 | Epoxy soybean oil and pentaerythritol in a weight ratio of 1:6 |
| Additive | 8 | Syrup and fructose in a weight ratio of 1:4 |

In conclusion, the self-curing organic synthetic resin composition was prepared through three stages. In which, the linear thermoplastic phenolic resin prepared in stage (1) and the phenol modified furan resin prepared in stage (2) were mixed in a certain weight ratio in stage (3) to obtain the self-curing organic synthetic resin composition for additive manufacturing.

Stage 1: Preparation of the Linear Thermoplastic Phenolic Resin

The raw materials for the linear thermoplastic phenolic resin was shown in Table 25.

TABLE 25

Raw materials for linear thermoplastic phenolic resin

| Raw materials | Amount (wt. %) | Specific materials |
|---|---|---|
| Phenolic compound | 15-45 | Phenol, p-aminophenol, p-cresol, m-cresol, m-aminophenol, p-nitrophenol, p-chloro-m-xylenol, p-tert-octyl phenol and a combination thereof |
| Aldehyde compound | 30-60 | Formaldehyde, acetaldehyde, butyraldehyde, valeraldehyde, terephthalaldehyde, trioxane, metaldehyde, dimethoxymethane, o-chlorobenzaldehyde and a combination thereof |
| Organic acid or organic acid salt | 0.2-0.8 | Formic acid, acetic acid, p-toluene sulfonic acid, acrylic acid, benzoic acid, propionic acid, zinc acetate, magnesium acetate, sodium benzoate, calcium propionate, aluminum acrylate and a combination thereof |
| Polymerization inhibitor | 1-4 | Hydroquinone, p-benzoquinone, 4-tert-butylcatechol, phenothiazine and a combination thereof |
| Organic solvent | 8-28 | Methanol, ethylene glycol, ethanol, acetone, isopropanol, methyl butanone and a combination thereof |

TABLE 25-continued

Raw materials for linear thermoplastic phenolic resin

| Raw materials | Amount (wt. %) | Specific materials |
|---|---|---|
| Coupling agent | 0.3-0.9 | Silane KH-560, silane KH-550, silane KH-602 and a combination thereof |
| Toughening agent | 0.1-0.7 | Polyvinyl butyral, polyether sulfone, polyphenylene ether ketone, polyvinyl alcohol and a combination thereof |
| Modifier | 1-5 | Aromatic solvent oil S-200 |

Process of producing the linear thermoplastic phenolic resin was described as follows.

(1) A phenolic compound, an organic acid or an organic acid salt as a catalyst, and a molecular polymerization inhibitor were added to an enamel reactor followed by stirring, and then an aldehyde compound was added to the enamel reactor.

(2) A steam valve was opened to heat the mixture, and the temperature raised to 85-90° C. in 25-30 min and was maintained at 85-90° C. for 30-40 min.

(3) The temperature further raised to 100-105° C. in 10-20 min and was maintained at 100-105° C. for 120-150 min.

(4) The mixture was subjected to vacuum dehydration until a desired level of dehydration was reached.

(5) The temperature was dropped to 70-75° C., and an organic solvent, a toughening agent and a modifier were added to the enamel reactor followed by stirring for 60-90 min.

(6) The temperature was further dropped to 30-35° C., and a coupling agent was added to the enamel reactor followed by stirring for 40-60 min. The mixture prepared herein was unloaded for use.

Stage 2: Preparation of the Phenol Modified Furan Resin

The raw materials for the phenol modified furan resin was shown in Table 26.

TABLE 26

Raw materials for phenol modified furan resin

| Raw materials | Amount (wt. %) | Specific materials and requirements |
|---|---|---|
| Phenolic compound | 12-28 | Phenol, bisphenol A, p-cresol, m-cresol, o-cresol, 3-methyl-4-isopropylphenol, 3-methyl-5-ethylphenol, 2,6-di-tert-butyl-4-ethylphenol and a combination thereof |
| Furfuryl alcohol | 20-70 | Furfuryl alcohol that includes 0.7% or less by weight of residual aldehyde, 0.3% or less by weight of water and 98% or more by weight of furfuryl alcohol, and has a cloud point of 10° C. or less and an acidity of 0.01 mol/L or less |
| Aldehyde compound | 5-15 | Aqueous formaldehyde solution having 36.5 wt. % formaldehyde, furfural, acetaldehyde, paraformaldehyde powders, benzaldehyde, phenylacetaldehyde, citral and a combination thereof |
| Organic acid | 0.4-1.2 | Formic acid, acetic acid, citric acid, benzoic acid, phthalic acid, oxalic acid, malonic acid, phenylacetic acid, succinic acid and a combination thereof |
| Diluent | 4-16 | Methanol, ethanol, isopropanol, furfuryl alcohol, ethylene glycol, toluene, petroleum ether |
| PH regulator | 0.3-0.7 | Aqueous solution having 48 wt. % sodium hydroxide and potassium hydroxide |
| Aldehyde trapping agent | 0.3-0.7 | Ammonia solution having 25-28 wt. % ammonia |
| Coupling agent | 0.3-1.3 | Silane KH-560, Silane KH-550 and Silane KH-602 |
| Organic waste liquid | 0-10 | 54% by weight of ethylene glycol, 36% by weight of ethanol, 2% by weight of furan resin and 8% by weight of furfuryl alcohol |
| Heat stabilizer | 0.2-0.6 | Phosphite, epoxy soybean oil, epoxy ester, pentaerythritol, xylitol, mannitol and a combination thereof |
| Additive | 3-9 | One or two of syrup and fructose |

Process of producing the phenol modified furan resin was described as follows.

(1) A phenolic compound, an aldehyde compound and an organic acid as a catalyst were added to an enamel reactor followed by stirring.

(2) A steam valve was opened to heat the mixture, and after the temperature raised to 70-75° C., half of furfuryl alcohol was added to the enamel reactor, and the temperature was maintained at 70-75° C. for 55-60 min.

(3) The temperature raised to 80-85° C. in 10-20 minutes, and then a quarter of furfuryl alcohol was added to the enamel reactor, and the temperature was maintained at 80-85° C. for 60-90 min.

(4) The temperature raised to 95-100° C. in 10-20 minutes, and then a pH regulator was added to the enamel reactor, and a quarter of furfuryl alcohol was added to the enamel reactor, and the temperature was maintained at 95-100° C. for 120-150 min.

(5) At 95-100° C., an organic waste liquid, a heat stabilizer and an additive were added to the enamel reactor followed by stirring for 50-60 min.

(6) The temperature was dropped to 60-65° C., and a diluent was added to the enamel reactor followed by stirring for 30-60 min.

(7) The temperature was dropped to 40-45° C., and an aldehyde trapping agent was added to the enamel reactor followed by stirring for 30-60 min.

(8) The temperature was dropped to 30-35° C., and a coupling agent was added to the enamel reactor followed by stirring for 30-60 min. The mixture prepared herein was unloaded for use.

Stage 3: Preparation of the Self-Curing Organic Synthetic Resin Composition for Additive Manufacturing 30% by weight of the linear thermoplastic phenolic resin prepared in stage (1) and 70% by weight of the phenol modified furan resin prepared in stage (2) were added to an enamel reactor followed by stirring. Then, the temperature raised to 35-40° C. and was maintained at 35-40° C. for 60-90 min. The mixture prepared herein was unloaded, tested and packaged to obtain the self-curing organic synthetic resin composition for additive manufacturing.

Example 13

The self-curing organic synthetic resin composition was used for additive manufacturing in the presence of a water-soluble or alcohol-soluble acidic solution.

In 3D additive manufacturing, the water-soluble or alcohol-soluble acidic solution was an alcoholic sulfonic acid solution having a total acidity of 32% and a free acid of 5% or less. The alcoholic sulfonic acid solution was 20% by weight of the self-curing organic synthetic resin composition for additive manufacturing.

During 3D printing process, the alcoholic sulfonic acid solution was uniformly mixed with raw sand materials to obtain a mixture. A layer of the mixture was laid onto a printing table, and then sprayed with the self-curing organic synthetic resin composition by a piezoelectric printhead according to a 3D model designed by a computer program. Due to the reaction between the self-curing organic synthetic resin composition and the alcoholic sulfonic acid solution applied on surfaces of the raw sand materials, the layer was rapidly cured at normal temperature. Then a next layer of the mixture was laid down over previous layers followed by spraying the self-curing organic synthetic resin composition and curing. The processes of laying, spraying and curing were repeated until a top layer was completed. Raw sand materials from unprinted areas were removed to obtain a 3D printed final product.

The self-curing organic synthetic resin composition prepared herein had advantages of high strength at normal temperature, excellent resistance to high temperature, high activity and good collapsibility, so a casting mold could be printed by 3D additive manufacturing for casting purpose, and the casting mold printed herein was suitable for casting various metal workpieces, greatly facilitating casting production.

Example 14

The self-curing organic synthetic resin composition was used for additive manufacturing in the presence of a water-soluble or alcohol-soluble acidic solution.

In 3D additive manufacturing, the water-soluble or alcohol-soluble acidic solution was an aqueous sulfonic acid solution having a total acidity of 16% and a free acid of 5% or less. The aqueous sulfonic acid solution was 60% by weight of the self-curing organic synthetic resin composition for additive manufacturing.

During 3D printing process, the aqueous sulfonic acid solution was uniformly mixed with raw sand materials to obtain a mixture. A layer of the mixture was laid onto a printing table, and then sprayed with the self-curing organic synthetic resin composition by a piezoelectric printhead according to a 3D model designed by a computer program. Due to the reaction between the self-curing organic synthetic resin composition and the aqueous sulfonic acid solution applied on surfaces of the raw sand materials, the layer was rapidly cured at normal temperature. Then a next layer of the mixture was laid down over previous layers followed by spraying the self-curing organic synthetic resin composition and curing. The processes of laying, spraying and curing were repeated until a top layer was completed. Raw sand materials from unprinted areas were removed to obtain a 3D printed final product.

Example 15

The self-curing organic synthetic resin composition was used for additive manufacturing in the presence of a water-soluble or alcohol-soluble acidic solution.

In 3D additive manufacturing, the water-soluble or alcohol-soluble acidic solution was an aqueous or alcoholic sulfonic acid solution having a total acidity of 16-32% and a free acid of 5% or less. The aqueous or alcoholic sulfonic acid solution was 20-60% by weight of the self-curing organic synthetic resin composition for additive manufacturing.

During 3D printing process, the aqueous or alcoholic sulfonic acid solution was uniformly mixed with raw sand materials to obtain a mixture. A layer of the mixture was laid onto a printing table, and then sprayed with the self-curing organic synthetic resin composition by a piezoelectric printhead according to a 3D model designed by a computer program. Due to the reaction between the self-curing organic synthetic resin composition and the aqueous or alcoholic sulfonic acid solution applied on surfaces of the raw sand materials, the layer was rapidly cured at normal temperature. Then a next layer of the mixture was laid down over previous layers followed by spraying the self-curing organic synthetic resin composition and curing. The processes of laying, spraying and curing were repeated until a top layer was completed. Raw sand materials from unprinted areas were removed to obtain a 3D printed final product.

Some information is concluded from the above-mentioned embodiments.

(1) The self-curing organic synthetic resin composition has a viscosity of 10-14 mpa·s at 25° C., which meets the requirement of additive manufacturing.

(2) The self-curing organic synthetic resin composition has a high tensile strength at normal temperature (above 2.0 MPa), while under the same conditions, the self-curing furan resin has a tensile strength of only 1.4 MPa at normal temperature, and the self-curing sodium silicate binder and the self-curing basic phenolic resin share the tensile strength of only 1.2 MPa at normal temperature.

(3) The self-curing organic synthetic resin composition has excellent resistance to high temperature, since it has a tensile strength of over 1.2 MPa at 1000° C., while under the same conditions, the self-curing furan resin has a tensile strength of only 0.15 MPa at 1000° C.

(4) The self-curing organic synthetic resin composition has high activity, since it reacts quickly with an aqueous or alcoholic sulfonic acid solution having a total acidity of 16-32% and a free acid of 5% or less. During the reaction, it has a usable life in the range of 0.5-2 min at sand temperature of 25° C. While under the same conditions, the self-curing furan resin and the self-curing sodium silicate binder each react with the aqueous or alcoholic sulfonic acid solution having a total acidity of 16-32% and a free acid of 5% or less. During the reaction, the self-curing furan resin has a usable life in the range of 3-7 min, and the self-curing sodium silicate binder has a usable life in the range of 5-15 min.

(5) The self-curing organic synthetic resin composition has a residual tensile strength of 0.2 MPa or less at 1000° C. Under the same conditions, the self-curing sodium silicate binder has a residual tensile strength of about 0.5 Mpa at 1000° C. The contrast proves that the self-curing organic synthetic resin composition has excellent collapsibility, resulting in an easy sand cleaning process in the late stage of casting production.

(6) An organic waste liquid which is generated during 3D inkjet printing in casting is reapplied to the resin system, reducing the cost of resin production and use, and reducing the environmental pollution.

(7) Syrup and fructose, as eco-friendly materials, are introduced into the self-curing organic synthetic resin composition to partially replace furfuryl alcohol in raw materials, facilitating the environmental protection.

(8) The self-curing organic synthetic resin composition is stable, and after a long-term storage, there is neither crystal formation nor changes in performance and indexes.

The embodiments above are not intended to limit the present invention. Any substitutions and changes made by those skilled in the art based on the embodiments disclosed herein without any creative efforts, should fall within the scope of the invention.

What is claimed is:

1. A self-curing organic synthetic resin composition for additive manufacturing, comprising 30-75% by weight of a linear thermoplastic phenolic resin and 25-70% by weight of a phenol modified furan resin, wherein the self-curing organic synthetic resin composition has a viscosity of 10-14 mPa·s at 25° C. and has a tensile strength of more than 1.2 MPa at 1000° C., and all of the percents by weight are based on the total weight of the linear thermoplastic phenolic resin and the phenol modified furan resin;

the linear thermoplastic phenolic resin is prepared by following operations:

(1a) adding a first phenolic compound, a first organic acid as a catalyst, and a polymerization inhibitor to an enamel reactor and stirring, and adding a first aldehyde compound to the enamel reactor;

(2a) heating a mixture of step (1a), heating the mixture to 85-90° C. in 25-30 min and maintaining the temperature at 85-90° C. for 30-40 min;

(3a) heating the mixture further to 100-105° C. in 10-20 min and maintaining the temperature at 100-105° C. for 120-150 min;

(4a) vacuum dehydrating the mixture;

(5a) cooling the mixture to 70-75° C., and adding an organic solvent, a toughening agent and a modifier to the enamel reactor, and stirring the mixture for 60-90 min; and (6a) cooling the mixture of step (5a) to 30-35° C., and adding a first coupling agent to the enamel reactor and stirring the mixture for 40-60 min, and wherein in the preparation of the linear thermoplastic phenolic resin:

the first phenolic compound is selected from the group consisting of phenol, p-aminophenol, p-cresol, m-cresol, m-aminophenol, p-nitrophenol, p-chloro-m-xylenol, p-tert-octyl phenol and a combination thereof;

the first aldehyde compound is selected from the group consisting of formaldehyde and a liquid aldehyde containing two or more carbon atoms; and the liquid aldehyde is selected from the group consisting of acetaldehyde, butyraldehyde, valeraldehyde, terephthalaldehyde, trioxane, metaldehyde, dimethoxymethane, o-chlorobenzaldehyde and a combination thereof;

the first organic acid is selected from the group consisting of formic acid, acetic acid, p-toluene sulfonic acid, acrylic acid, benzoic acid, propionic acid and a combination thereof;

the polymerization inhibitor is molecular, and is selected from the group consisting of hydroquinone, p-benzoquinone, 4-tert-butylcatechol, phenothiazine and a combination thereof;

the organic solvent is a polar organic solvent, and is selected from the group consisting of methanol, ethylene glycol, ethanol, acetone, isopropanol, methyl butanone and a combination thereof;

the first coupling agent is silane which is selected from the group consisting of 3-Glycidoxypropyltrimethoxysilane, 3-Aminopropyltriethoxysilane, 3-(2-Aminoethylamino) propyl-dimethoxymethylsilane, and a combination thereof;

the toughening agent is selected from the group consisting of polyvinyl butyral, polyether sulfone, polyphenylene ether ketone, polyvinyl alcohol and a combination thereof;

the modifier is an aromatic solvent oil; and wherein the phenol modified furan resin is prepared by following operations:

(1b) adding a second phenolic compound, a second aldehyde compound and a second organic acid to an enamel reactor and stirring;

(2b) heating a mixture of step (1b) to 70-75° C., adding half of furfuryl alcohol to the enamel reactor, and maintaining the temperature at 70-75° C. for 55-60 min;

(3b) heating the mixture of step (2b) to 80-85° C. in 10-20 minutes, and adding a quarter of furfuryl alcohol to the enamel reactor, and maintaining the temperature at 80-85° C. for 60-90 min;

(4b) heating the mixture of step (3b) to 95-100° C. in 10-20 minutes, and adding a pH regulator to the enamel reactor to adjust pH of the mixture of step (3b) to 5.7-6.0, and adding a quarter of furfuryl alcohol to the enamel reactor, and maintaining the temperature at 95-100° C. for 120-150 min;

(5b) adding an organic waste liquid, a heat stabilizer and an additive to the enamel reactor at 95-100° C., and stirring the mixture for 50-60 min;

(6b) cooling the mixture of step (5b) to 60-65° C., and adding a diluent to the enamel reactor, and stirring the mixture for 30-60 min;

(7b) cooling the mixture of step (6b) to 40-45° C., and adding an aldehyde trapping agent to the enamel reactor, and stirring for 30-60 min; and (8b) cooling the mixture of step (7b) to 30-35° C., and adding a second coupling agent to the enamel reactor, and stirring the mixture for 30-60 min, and wherein in the preparation of the phenol modified furan resin:

the second phenolic compound is phenol, bisphenol A, or a monoalkyl- or dialkyl-substituted phenol;

the furfuryl alcohol comprises 0.7% or less by weight of residual aldehyde, 0.3% or less by weight of water and 98% or more by weight of furfuryl alcohol; and the furfuryl alcohol has a cloud point of 10° C. or less and an acidity of 0.01 mol/L or less, and all of the percents by weight are based on the total weight of the residual aldehyde, the water and the furfuryl alcohol;

the second aldehyde compound is selected from the group consisting of an aqueous formaldehyde solution having 36.5 wt. % formaldehyde, furfural, acetaldehyde, paraformaldehyde powders, benzaldehyde, phenylacetaldehyde, citral and a combination thereof;

the second organic acid is selected from the group consisting of formic acid, acetic acid, citric acid, benzoic acid, phthalic acid, oxalic acid, malonic acid, phenylacetic acid, succinic acid and a combination thereof;

the diluent is selected from the group consisting of methanol, ethanol, isopropanol, furfuryl alcohol, ethylene glycol, toluene, petroleum ether and a combination thereof;

the pH regulator is an aqueous alkali metal hydroxide solution having 48 wt. % alkali metal hydroxide, and the alkali metal hydroxide is one or two of sodium hydroxide and potassium hydroxide;

the aldehyde trapping agent is an ammonia solution having 25-28 wt. % ammonia;

the second coupling agent is an aqueous silane which is selected from the group consisting of 3-Glycidoxypropyltrimethoxysilane, 3-Aminopropyltriethoxysilane, 3-(2-Aminoethylamino) propyl-dimethoxymethylsilane, and a combination thereof;

the organic waste liquid is produced by cleaning a printhead of a 3D inkjet printer during 3D inkjet printing in casting, and the organic waste liquid comprises 54% by weight of ethylene glycol, 36% by weight of ethanol, 2% by weight of furan resin and 8% by weight of furfuryl alcohol, and all of the percents by weight are based on the total weight of the ethylene glycol, the ethanol, the furan resin and furfuryl alcohol;

the heat stabilizer is selected from the group consisting of phosphite, epoxy soybean oil, epoxy ester, pentaerythritol, xylitol, mannitol and a combination thereof; and the additive is one or two of syrup and fructose, and wherein the self-curing organic synthetic resin composition is prepared by following operations:

(3a) adding the linear thermoplastic phenolic resin and the phenol modified furan resin to an enamel reactor and stirring a mixture;

(3b) heating the mixture to 35-40° C., and maintaining 35-40° C. for 60-90 min; and (3c) unloading, testing, and packaging the mixture to obtain the self-curing organic synthetic resin composition for additive manufacturing.

2. The self-curing organic synthetic resin composition of claim 1, wherein the catalyst can be replaced as an organic acid salt, and the organic acid salt is selected from the group consisting of zinc acetate, magnesium acetate, sodium benzoate, calcium propionate, aluminum acrylate and a combination thereof.

3. The self-curing organic synthetic resin composition of claim 1, wherein the monoalkyl- or dialkyl-substituted phenol is selected from the group consisting of p-cresol, m-cresol, o-cresol, 3-methyl-4-isopropylphenol, 3-methyl-5-ethylphenol, 2,6-di-tert-butyl-4-ethylphenol and a combination thereof.

4. The self-curing organic synthetic resin composition of claim 1, wherein the organic waste liquid is produced by cleaning a printhead of a 3D inkjet printer during 3D inkjet printing in casting.

* * * * *